(12) United States Patent
Utykanski

(10) Patent No.: US 10,853,608 B2
(45) Date of Patent: Dec. 1, 2020

(54) BARCODE-READING ACCESSORY FOR INTERACTING WITH A TOUCH INTERFACE ON A MOBILE DEVICE

(71) Applicant: The Code Corporation, Draper, UT (US)

(72) Inventor: Phil Utykanski, Saratoga Springs, UT (US)

(73) Assignee: The Code Corporation, Murray, UT (US)

( * ) Notice: Subject to any disclaimer, the term of this patent is extended or adjusted under 35 U.S.C. 154(b) by 0 days.

(21) Appl. No.: 16/212,458

(22) Filed: Dec. 6, 2018

(65) Prior Publication Data

US 2020/0184165 A1    Jun. 11, 2020

(51) Int. Cl.
| G06K 7/10 | (2006.01) |
| G06K 7/14 | (2006.01) |
| G06F 3/0482 | (2013.01) |
| G06F 3/0488 | (2013.01) |
| G06F 1/16 | (2006.01) |
| H04M 1/02 | (2006.01) |

(52) U.S. Cl.
CPC ......... G06K 7/1413 (2013.01); G06F 1/1633 (2013.01); G06F 3/0482 (2013.01); G06F 3/04883 (2013.01); G06K 7/10881 (2013.01); H04M 1/0202 (2013.01)

(58) Field of Classification Search
CPC ........ G06F 1/16; G06F 1/1613; G06F 1/1626; G06F 1/1628; G06F 1/1632; G06F 1/1633; G06F 3/044; G06F 3/0441–0448; G06K 7/089; G06K 7/10881
See application file for complete search history.

(56) References Cited

U.S. PATENT DOCUMENTS

| 8,955,678 | B2 * | 2/2015 | Murphy | ................. | B23P 19/00 206/320 |
| 9,831,905 | B1 * | 11/2017 | Flores | ................. | H04B 1/3888 |
| 9,876,522 | B2 * | 1/2018 | Huang | ................. | H04B 1/3888 |
| 10,437,393 | B2 * | 10/2019 | Liu | ....................... | G06F 1/1626 |
| 2010/0238119 | A1 * | 9/2010 | Dubrovsky | ......... | G06F 3/04886 345/169 |
| 2012/0039023 | A1 * | 2/2012 | Renwick | ............... | G06F 1/1626 361/679.01 |
| 2012/0262618 | A1 * | 10/2012 | Weakly | ................. | A45C 11/00 348/333.01 |
| 2015/0220766 | A1 * | 8/2015 | Russell | ............. | G06K 7/10881 235/462.42 |

(Continued)

*Primary Examiner* — Thien M Le
*Assistant Examiner* — April A Taylor
(74) *Attorney, Agent, or Firm* — Timothy P. O'Hagan; Ray Quinney & Nebeker

(57) ABSTRACT

The present disclosure relates to a barcode-reading system that includes a mobile device accessory attached to a mobile device. The mobile device accessory includes a button assembly having an outer button and dielectric material. When an input object (e.g., a finger) comes into contact with the button assembly, the dielectric material comes into contact with a touch interface (e.g., a button or touchscreen) and causes the mobile device to detect a touch input. In particular, the dielectric material of the button assembly may activate a capacitive property of a button or touchscreen to enable the mobile device to detect the touch input.

18 Claims, 7 Drawing Sheets

(56) References Cited

U.S. PATENT DOCUMENTS

2015/0338885 A1* 11/2015 Hoobler ............... H04B 1/3888
224/191
2019/0007084 A1* 1/2019 Haug ..................... A45C 11/00
2020/0127697 A1* 4/2020 Wang .................... H04M 1/026

* cited by examiner

BARCODE-READING ACCESSORY FOR INTERACTING WITH A TOUCH INTERFACE ON A MOBILE DEVICE

BACKGROUND

Mobile devices such as smartphones and tablet computers are in widespread use today, most often in connection with entertainment, communication, and productivity. Many mobile devices include a camera. With appropriate software, such mobile devices can be used to read and process barcode patterns.

Some mobile devices have poor barcode-reading capabilities. Accessories have been developed that attach to a mobile device and enhance barcode-reading capabilities of the mobile device. A barcode-reading accessory that is configured for use with a mobile device may include one or more optical components that modify the field of view of a camera of the mobile device and/or the field of illumination of illumination source(s) of the mobile device, thereby altering the characteristics of captured images so that the captured images are more suitable for reading barcodes than they otherwise would be.

When a mobile device is being used to read a barcode, user input may be provided via an input device, such as a button on the mobile device. A barcode-reading accessory that is being used with the mobile device may be designed to accommodate such an input device. For example, the accessory may include a button that aligns with a button on the mobile device. The accessory may be configured so that activation of the button on the accessory causes the button on the mobile device to be activated as well.

Many mobile devices include a mechanical button that physically moves when it is activated. An accessory that is designed for use with this kind of mobile device may also include a mechanical button that interacts with the mechanical button on the mobile device. For example, the accessory may be designed so that physically depressing the button on the accessory causes the button on the mobile device to be physically depressed as well.

However, some mobile devices include a non-mechanical button that relies on capacitive sensing for activation. Such a button is inoperable unless it makes contact with a conductive object, such as a user's finger. Other mobile devices do not include any type of button whatsoever. For both of these types of mobile devices, it can be difficult to design a barcode-reading accessory that enables a user to provide desired input to the mobile device.

SUMMARY

In accordance with one aspect of the present disclosure, a barcode-reading system is disclosed that includes a mobile device that includes a touch interface and a barcode-reading accessory. The barcode-reading accessory may include an accessory housing configured to be attached to the mobile device and a button assembly. The accessory housing may include a first opening corresponding to a first portion of the touch interface. A button assembly may include an outer button and a dielectric material. The outer button may be positioned within the first opening of the housing. The dielectric material may be positioned between the outer button and the touch interface of the mobile device when the housing is attached to the mobile device. The outer button may include a compressible material that, when compressed toward the touch interface while the accessory housing is attached to the mobile device, causes the dielectric material to engage the touch interface, causing the mobile device to detect an input corresponding to the first portion of the touch interface.

Causing the mobile device to detect the input may include activating capacitive properties of the touch interface in response to the dielectric material engaging the first portion of the touch interface. Causing the mobile device to detect the input may include causing a camera on the mobile device to capture an image including a barcode within a field of view of the camera.

The accessory housing may be sized to be attached to a corresponding make or model of the mobile device. The button assembly may be positioned within the first opening of the accessory housing based on the corresponding make or model of the mobile device. Alternatively, the first portion of the touch interface may correspond to a discrete region of a touchscreen of the touch interface.

The accessory housing may include a second opening over a second portion of the touch interface that provides input access to the second portion of the touch interface. The second opening of the accessory housing may be substantially larger than the first opening of the accessory housing. The second portion of the touch interface may include a majority of a total area of the touch interface on the mobile device.

The barcode-reading accessory may include a screen cover attached to the accessory housing. When the accessory housing is attached to the mobile device, the screen cover may cover the second portion of the touch interface. The screen cover may further include an opening that aligns with the first opening of the accessory housing when the accessory housing is attached to the mobile device. The screen cover may include an adhesive property that, when placed in contact with the touch interface when the accessory housing is attached to the mobile device, secures components of the barcode-reading accessory in place relative to the touch interface.

The accessory housing may include a liquid silicon rubber (LSR) seal that, when the accessory housing is attached to the mobile device, secures components of the barcode-reading accessory in place relative to the touch interface.

The outer button may include a compressible rubber material that, when compressed, applies a force on the dielectric material and causes the dielectric material to engage the touch interface by coming into contact with the first portion of the touch interface of the mobile device. The dielectric material may include a dielectric foam.

In accordance with another aspect of the present disclosure, a barcode-reading accessory is disclosed that may include an accessory housing sized and shaped to attach to a mobile device and a button assembly positioned at least partially within the first opening of the accessory housing. The accessory housing may include a first opening at a first location within the accessory housing. The first location within the accessory housing may correspond to a first portion of a touch interface of the mobile device associated with a desired input of an application on the mobile device. The button assembly may include an outer button positioned within the first opening and visible from a front surface of the accessory housing and a dielectric material positioned behind the outer button from the front surface of the accessory housing. The outer button may include a compressible material that, when compressed inward from the front surface of the accessory housing, causes the dielectric material to engage the touch interface of the mobile device when the accessory housing is attached to the mobile device.

Causing the dielectric material to engage the touch interface of the mobile device may cause the mobile device to detect the desired input of the application on the mobile device by activating capacitive properties of the touch interface of the mobile device corresponding to the first location on the mobile device.

The accessory housing may be sized to be attached to a corresponding make or model of the mobile device that does not have a physical home button on a front surface of the mobile device. The button assembly may be positioned within the first opening of the accessory housing based on the corresponding make or model of the mobile device.

The accessory housing may include a second opening corresponding to a location of a second portion of the touch interface. The second opening may provide input access to the second portion of the touch interface when the accessory housing is attached to the mobile device.

The barcode-reading accessory may include a screen cover attached to the accessory housing. When the accessory housing is attached to the mobile device, the screen cover may cover the second portion of the touch interface while providing input access to the second portion of the touch interface.

The accessory housing may include a liquid silicon rubber (LSR) seal that, when the accessory housing is attached to the mobile device, secures components of the barcode-reading accessory in place relative to the mobile device.

The outer button may include a compressible rubber material that, when compressed, applies a force on the dielectric material and causes the dielectric material to engage the touch interface by coming into contact with the first portion of the touch interface of the mobile device. The dielectric material may include a dielectric foam.

DETAILED DESCRIPTION

Figure 1:
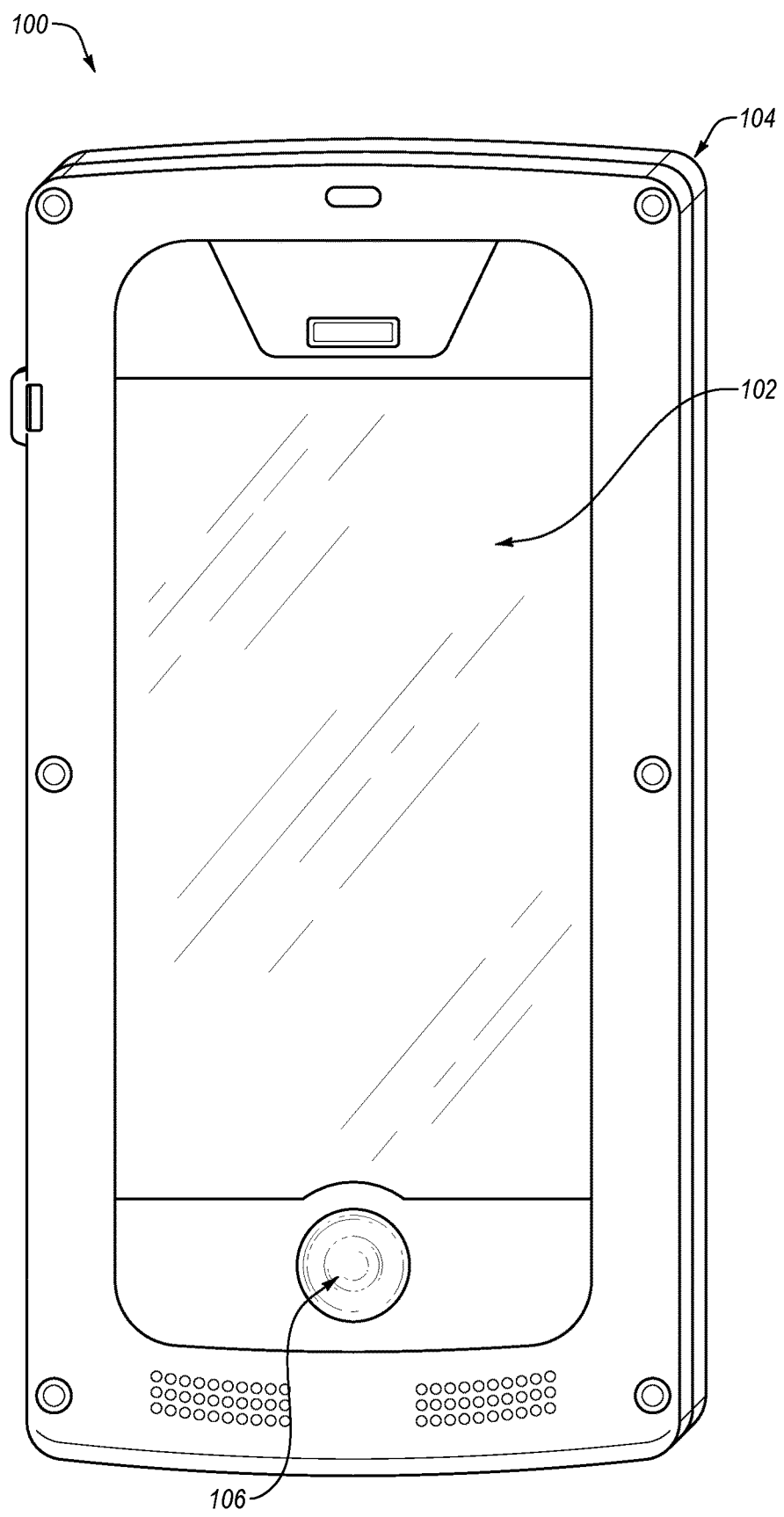
FIG. 1 illustrates an example barcode-reading system including a mobile device attachment attached to a mobile device in accordance with one or more embodiments.

The present disclosure provides a barcode-reading system that includes a mobile device accessory configured to be attached to a mobile device (e.g., a smartphone). The mobile device accessory includes a button assembly including a dielectric material that enables an individual to interact with a portion of a capacitive touch interface (e.g., a capacitive button, a discrete region of a touchscreen device) and activate capacitive properties of the touch interface. In this way, an individual can conveniently and reliably provide a touch input to a barcode-reading system including a mobile device and mobile device accessory attached thereon.

As used herein, a "mobile device" may refer to a portable, hand-held computing device that comprises a camera. A mobile device may also include a touch interface (as that term is defined below). One example of a mobile device is a smartphone. Another example of a mobile device is a tablet computer. Yet another example of a mobile device is a hybrid tablet/smartphone device (e.g., a "phablet") or any other hand-held or portable computing device.

As used herein, a "camera" may refer to an apparatus for capturing digital images. A camera that is included in a digital computing device such as a mobile device typically comprises a lens and an image sensor. In one or more implementations, the camera can capture one or multiple images in response to receiving an input from the mobile device (e.g., in response to detecting a touch input) and in accordance with instructions of an application (e.g., a barcode-reading application) installed on the mobile device.

As used herein, the term "touch interface" refers to an interface of a mobile device configured to detect touch inputs. In particular, a touch interface may include one or more components of a mobile device capable of detecting a touch input of an object (e.g., a finger or stylus) that comes into contact with and activates capacitive properties of the component(s). For example, a touch interface may include components such as a touchscreen display for displaying a graphical user interface (GUI), one or more capacitive buttons, or a combination of a touchscreen display and capacitive button(s). In other words, a touch interface may include one or more capacitive buttons and/or one or more discrete regions of a touchscreen display.

As used herein, an "attachment" or "accessory" (e.g., a barcode-reading accessory) may be used interchangeably to refer to an apparatus or assembly configured to attach to a body of a mobile device to provide additional functionality or otherwise enhance barcode-reading capabilities of the mobile device. When attached to the mobile device, the accessory may cover a relatively small portion of the mobile device. Alternatively, an attachment may include a protective case that covers a substantial portion of the mobile device. In addition, a mobile device accessory can include any number of components (e.g., optical components that interact with a camera of the mobile device) to enhance image capturing and/or barcode-reading capabilities of a mobile device.

As used herein, a "button assembly" may refer to a portion of a mobile device accessory positioned over a portion of a touch interface of the mobile device capable of detecting a touch input. As will be discussed in further detail below, the button assembly includes an outer button and a dielectric material that, when pressed against a portion of the touch interface, activates a capacitive property of the touch interface and enables the mobile device to detect a touch input.

Additional detail will now be provided regarding the barcode-reading system including a mobile device and barcode-reading accessory (or simply "accessory") in relation to illustrative figures portraying example implementations. For example, FIG. 1 illustrates a barcode-reading system 100 in accordance with one or more implementations. As shown in FIG. 1, the example barcode-reading system 100 includes a mobile device 102, which may include a smartphone having a touch interface thereon. The barcode-reading system 100 further includes a barcode-reading accessory 104 attached to and covering a substantial portion of the mobile device 102.

As shown in FIG. 1, the barcode-reading accessory includes a button assembly 106 positioned over a portion of a touch interface of the mobile device 102. The button assembly 106 may cover different portions of the touch interface depending on a design of the barcode-reading accessory 104 and a corresponding make or model of the mobile device 102. For example, in one or more implementations, the button assembly 106 is positioned over a capacitive button of the mobile device 102 when the barcode-reading accessory 104 is attached to the mobile device 102, as shown in FIG. 1. As will be discussed in further detail below, the button assembly 106 includes a dielectric material that activates capacitive properties of the capacitive button when the button assembly 106 is pressed (e.g., causing the dielectric material to engage with the capacitive button).

As another example, the button assembly 106 may be positioned over a discrete portion of the mobile device 102 corresponding to a location on a capacitive touchscreen configured to detect a touch input in response to an object capable of conducting electricity (e.g., a finger, capacitive stylus) coming into contact with the touchscreen. For instance, where the mobile device 102 does not include any buttons (e.g., the touch interface includes only a touchscreen display), the button assembly 106 may be positioned over a discrete region of the touchscreen. Accordingly, as will be discussed in further detail below, the button assembly 106 may activate capacitive properties of the discrete region of the touchscreen over which the button assembly 106 is positioned when the button assembly 106 is pressed.

When the barcode-reading system 100 is assembled, the barcode-reading accessory 104 may supplement or otherwise enhance barcode-reading capabilities of the mobile device 102. For example, as will be discussed in further detail below, the barcode-reading accessory 104 may include one or more optical components (e.g., lenses, filters, mirrors, illuminators) within an accessory housing to enhance images captured by a camera of the mobile device 102 so that the images are more suitable for reading barcodes than they otherwise would be. A barcode-reading application on the mobile device 102 may utilize the captured image(s) to detect, decode, or otherwise process data associated with a barcode represented within the image(s) captured by the mobile device 102.

Figure 2:
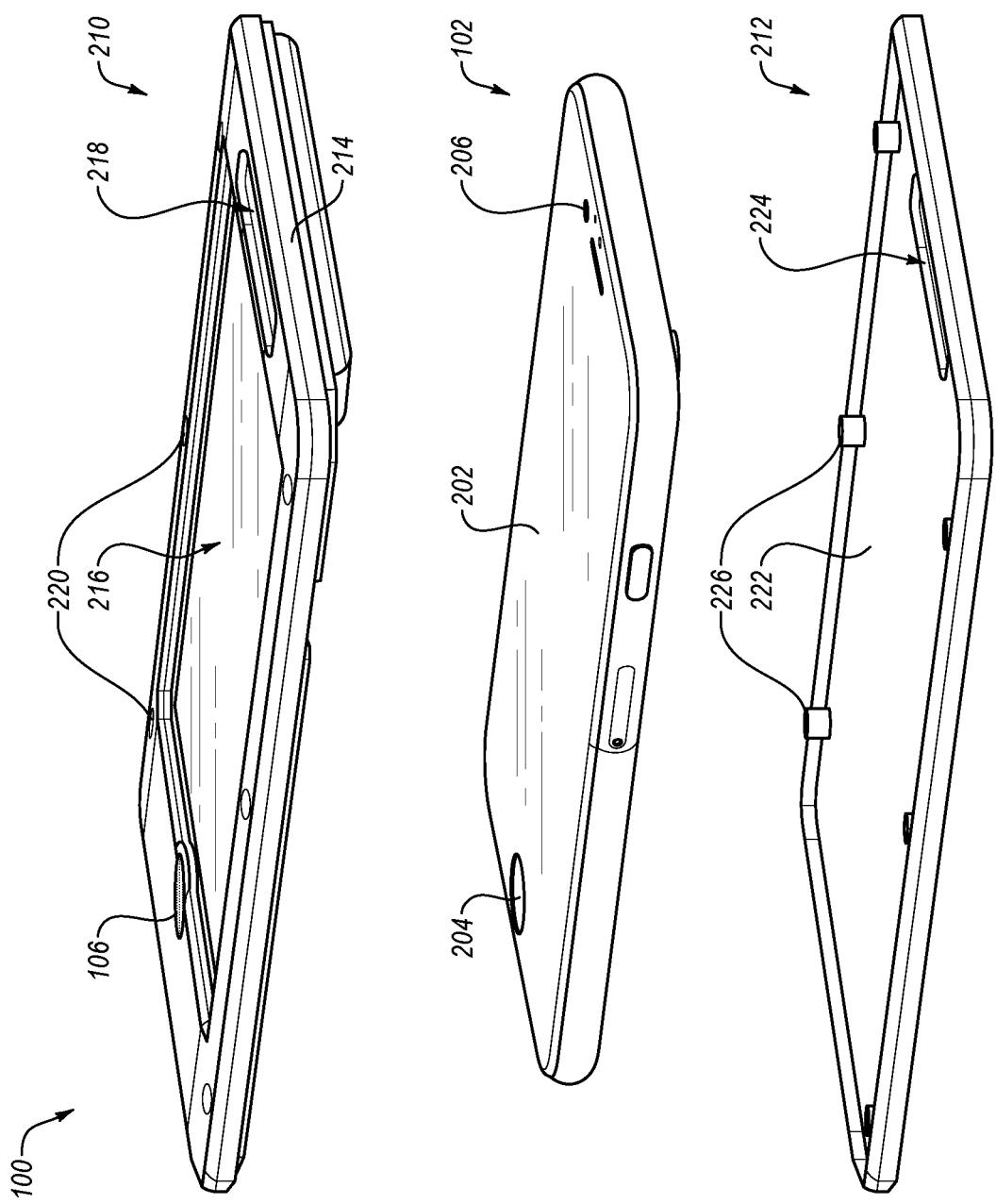
FIG. 2 illustrates an exploded view of the barcode-reading system including the mobile device attachment and the mobile device in accordance with one or more embodiments.

In FIG. 2, additional detail is provided in connection with the barcode-reading system 100 including the mobile device 102 and the barcode-reading accessory 104. For example, FIG. 2 illustrates an example mobile device 102 positioned between an upper housing assembly 210 and a lower housing assembly 212 of the barcode-reading accessory 104, which collectively make up an accessory housing of the barcode-reading accessory 104. The mobile device 102 may include similar features and functionality as the mobile device 102 enclosed within the barcode-reading accessory 104 described above in connection with FIG. 1.

As shown in FIG. 2, the mobile device 102 includes an input interface (e.g., a touch interface) including a touchscreen 202 and a button 204. The touchscreen 202 may be a capacitive touchscreen configured to provide a display of a graphical user interface including icons or touch elements displayed at discrete regions of the touchscreen 202. The mobile device 102 can recognize or otherwise detect touch inputs (e.g., tap gestures, swipe gestures, etc.) with respect to the touchscreen 202. The mobile device 102 can further display icons or graphics at different locations on the touchscreen 202 that enable a user of the mobile device 102 to interact with a graphical user interface and provide touch inputs for further processing by the mobile device 102.

As further shown, the input interface includes a button 204. In one or more implementations, the button 204 is a capacitive button including one or more capacitive sensors for detecting contact of an object that is conductive and/or otherwise has a dielectric property different from air. For example, without the accessory 104 attached thereon, the button 204 may traditionally be configured to detect contact of a finger, capacitive stylus, or other object capable of drawing a current when placed into contact with the button 204. As will be described in further detail below in connection with FIG. 3, the button 204 may detect a touch input based on a dielectric material of the button assembly 106 coming into contact with the button 204 of the mobile device 102.

While FIG. 2 illustrates an example mobile device 102 including a touch interface that includes both a touchscreen 202 and a button 204, it will be understood that the touch interface may have other configurations of components. For example, the touch interface of a mobile device may alternatively include one or more additional buttons capable of detecting touch inputs. As another example, a touch interface may consist of a touchscreen that extends over a larger portion of the top surface of the mobile device and includes no button(s).

The mobile device 102 may include one or more cameras that are configured to capture images. In FIG. 2, the mobile device 102 is shown with a camera lens 206 on a front surface of the mobile device 102. The mobile device 102 may also include one or more camera lenses (not shown) on the back surface of the mobile device 102. The mobile device 102 may also include one or more illumination sources (not shown in FIG. 2). The illumination source(s) associated with a particular camera may be configured to illuminate an area corresponding to a field of view of the camera, thereby enabling the camera to capture higher quality images.

As illustrated in FIG. 2, the barcode-reading accessory 104 includes an upper housing assembly 210 having a size and shape corresponding to a size and shape of the mobile device 102. For example, the upper housing assembly 210 (as well as a lower housing assembly 212) of the barcode-reading accessory 104 may have a shape corresponding to a make or model of mobile device 102 that is configured to attach to and/or enclose a portion of the mobile device 102 (e.g., as shown in FIG. 1).

The upper housing assembly 210 may include an upper casing 214 made of plastic, metal, or other combination of sturdy materials that provides a protective cover for the mobile device 102. In this way, the barcode-reading accessory 104 may provide enhanced barcode-reading capabilities of the mobile device 102 in addition to providing a protective covering to protect the mobile device from breaking or being damaged.

As shown in FIG. 2, the barcode-reading accessory 104 includes a button assembly 106 within an opening (e.g., a circular opening) of the upper housing assembly 210. In particular, the button assembly 106 may be sized to fit within the upper housing assembly 210 at a location that aligns with or otherwise corresponds to placement of the button 204 on the mobile device 102. Accordingly, when secured to the mobile device 102, the button assembly 106 can be aligned with the button 204 to enable a user of the barcode-reading system 100 to interact with or otherwise provide an input to the button 204 of the mobile device 102 by pressing or otherwise applying a force to an outer surface of the button assembly 106, as will be discussed in further detail below.

While the example shown in FIG. 2 shows a button assembly 106 within an opening of the upper housing assembly 210 corresponding to a position of the button 204 on the mobile device, the button assembly 106 may alternatively be positioned within the upper housing assembly 210 to correspond with a specific location on the touchscreen 202. For instance, a barcode-reading application on the mobile device 102 may provide a selectable icon or graphic via the touchscreen 202 at a position on the touchscreen 202 corresponding to an expected position of the button assembly 106 when the barcode-reading accessory 104 is attached to the mobile device 102. Accordingly, while FIG. 2 illustrates an example in which a user of the barcode-reading system 100 interacts with the button 204 of the touch interface via the button assembly 106, a user may similarly interact with any portion of the touch interface corresponding to an alternative position of the button assembly 106 within the upper housing assembly 210.

The upper housing assembly 210 may include a touchscreen opening 216 that provides access to the touchscreen 202 when the barcode-reading accessory 104 is attached to the mobile device 102. The touchscreen opening 216 may include an absence of material that enables a user of the barcode-reading system 100 to interact directly with the touchscreen 202. Alternatively, in one or more embodiments the touchscreen opening 216 may include a screen cover (described below) that enables a user of the barcode-reading system 100 to interact with a graphical user interface and provide input(s) to the mobile device 102 via the touchscreen 202.

The upper housing assembly 210 may additionally include an opening 218 through which light can pass to the camera lens 206 on the front-facing surface of the mobile device 102. FIG. 2 additionally shows that a lower housing assembly 212 of the barcode-reading accessory 104 also includes an opening 224 through which light can pass to a camera lens on the back surface of the mobile device 102.

The barcode reading accessory 104 may include one or more components for interacting with a camera and/or an illumination source of the mobile device 102 to enhance barcode-reading capabilities of the mobile device 102. For example, the barcode reading accessory 104 may include one or more optical components that are configured to modify the field of view of a camera of the mobile device 102 and/or the field of illumination of illumination source(s) of the mobile device 102, thereby altering the characteristics of images that are captured by the camera of the mobile device 102. The optical components may be configured to modify the characteristics of the captured images in such a way that the captured images are more suitable for reading barcodes than they otherwise would be. The optical components may be included in the lower housing assembly 212 of the barcode-reading accessory 104 in order to modify the characteristics of images captured by a camera whose lens is positioned on the back surface of the mobile device 102.

Some examples of optical components that may be included in the barcode-reading accessory 104 are described in U.S. patent application Ser. No. 14/527,645, titled "A Barcode-Reading Enhancement System for a Computing Device That Comprises a Camera and an Illumination System," filed on Oct. 29, 2014, having U.S. patent application Ser. No. 14/581,821, titled "Target Generating Structure for an Accessory for a Mobile Device," filed on Dec. 23, 2014.

The upper housing assembly 210 of the barcode-reading accessory 104 may couple together with a lower housing assembly 212 when attached to the mobile device 102. In particular, the upper housing assembly 210 includes connection points 220 positioned around the upper casing 214 of the upper housing assembly 210 corresponding to connection points 226 positioned around the lower casing 222 of the lower housing assembly 212. The connection points 220, 226 may include openings through which screws or other objects may be inserted to fasten the upper housing assembly 210 to the lower housing assembly 212. Alternatively, the connection points 220, 226 may include other fastening mechanisms such as clips or magnets or may be sized to fit together in order to fasten components of the respective housing assemblies 210, 212 in place relative to the mobile device 102.

Figure 3:
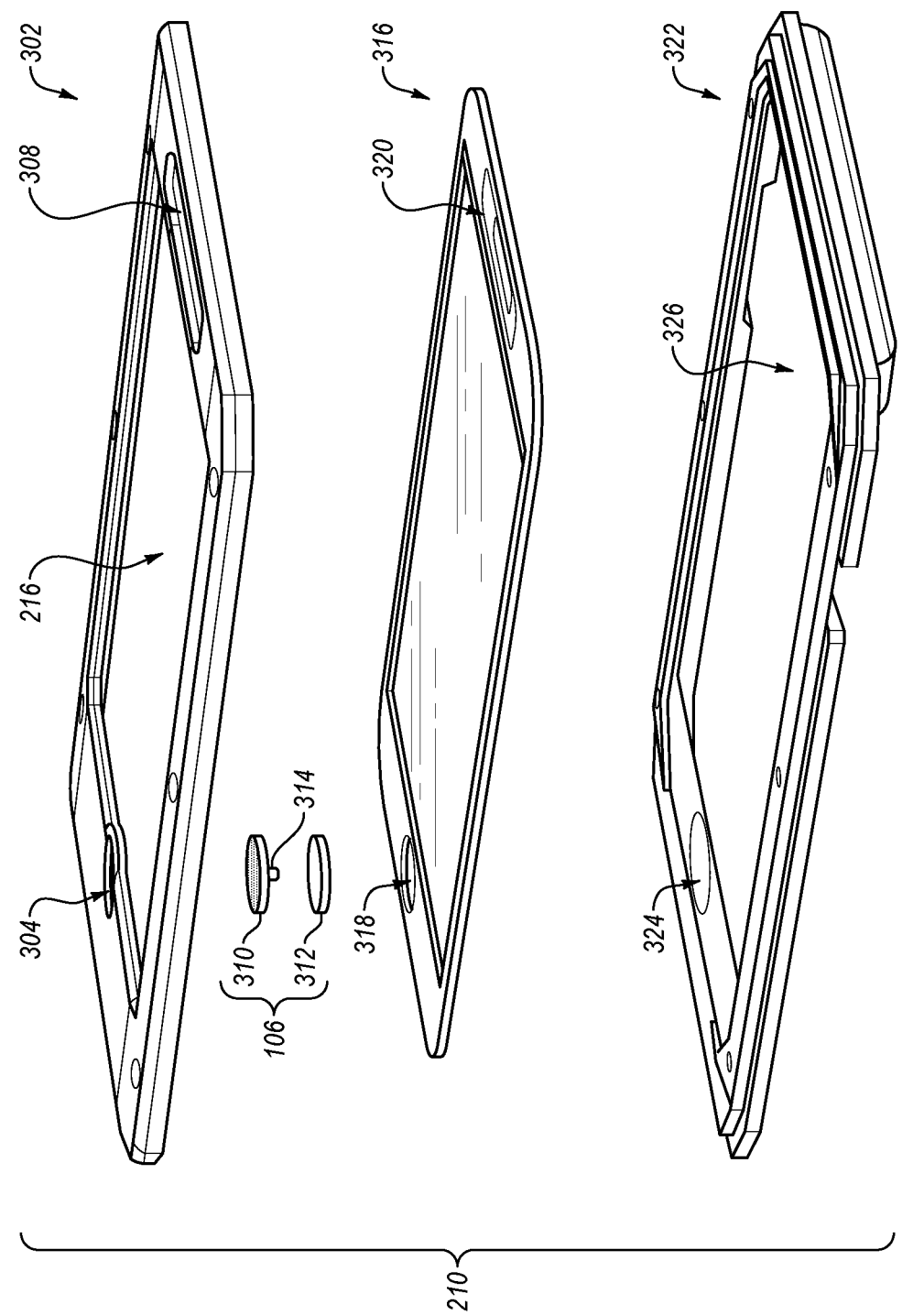
FIG. 3 illustrates an exploded view of an upper housing assembly of the mobile device attachment in accordance with one or more embodiments.

Additional detail will now be provided in connection with the upper housing assembly 210 in reference to FIG. 3. In particular, FIG. 3 illustrates an exploded view of the upper housing assembly 210 including the button assembly 106 in accordance with one or more embodiments described above. As shown in FIG. 3, the upper housing assembly 210 includes a top casing 302 made from a plastic, metal, or other rigid material that provides a protective covering for a mobile device 102 when the barcode-reading accessory 104 is secured to the mobile device 102. The top casing 302 may additionally be sized and shaped for a corresponding make or model of mobile device 102.

The top casing 302 includes a number of openings. For example, the top casing 302 includes a button opening 304 corresponding to placement of the button assembly 106 within the upper housing assembly 210 of the barcode-reading accessory 104. As discussed above, the button opening 304 may correspond to a position of a button 204 on the mobile device 102. Alternatively, the button opening 304 may correspond to a discrete region or location on the touchscreen 202 of the mobile device 102.

The top casing 302 may further include the touchscreen opening 216 corresponding to a size and position of the touchscreen 202 on the mobile device 102. In particular, when the barcode-reading accessory 104 is attached to the mobile device 102, the touchscreen opening 216 provides touch access to at least a portion of the touchscreen 202 that enables a user of the barcode-reading system 100 to interact with the touchscreen 202 and provide user inputs to the mobile device 102.

As further shown, the top casing 302 may include a camera opening 308 corresponding to placement of the camera lens 206 or other optical system(s) on the front-facing surface of the mobile device 102. In particular, when the barcode-reading accessory 104 is attached to the mobile device 102, the camera opening 308 provides an opening through which light can pass.

As mentioned above, and as shown in FIG. 3, the upper housing assembly 210 includes a button assembly 106. The button assembly 106 may include an outer button 310 configured to face outward from the upper housing assembly 210 when assembled and attached to the mobile device 102 such that the outer button 310 is visible from a front surface of the accessory housing. The outer button 310 is configured to receive a finger or other object coming into contact with the button assembly 106 when providing an input to the barcode-reading system 100.

The outer button 310 may be made from a variety of materials. For example, the outer button 310 may include a rubber or other non-conductive material. In addition, the outer button 310 may include a flexible material that, when pressed, is configured to compress inward or move toward the button 204 (or touchscreen 202) of the mobile device 102.

As further shown in FIG. 3, the button assembly 106 includes a dielectric material 312. When the button assembly 106 is assembled, the dielectric material 312 may be positioned between the outer button 310 and the mobile device 102 (e.g., between the outer button 310 and the button 204 of the mobile device 102).

The dielectric material 312 may be made from a variety of conductive or capacitive materials. For example, the dielectric material 312 may include a dielectric foam configured to compress when the outer button 310 (or a protruding member 314 of the outer button 310) comes into contact with the dielectric material 312. Indeed, the dielectric material 312 may be made from a material that, when it is compressed and comes into contact with or exerts a force on the touch interface (e.g., the button 204 of the mobile device 102), activates a capacitive property of the touch interface. As will be described in further detail below, activating the capacitive property of the touch interface provides an input to the mobile device 102 for further processing (e.g., by a barcode-reading application).

The button assembly 106 may further include a protruding member 314. In particular, in one or more embodiments, the outer button 310 may include a dimple, a texture, or another object protruding from a bottom surface of the outer button 310 that, when the outer button 310 is compressed, makes contact with the dielectric material 312 and exerts a force on the dielectric material 312 towards the mobile device 102. The protruding member 314 may be made using a similar material as the outer button 310 (e.g., a compressible rubber material) or may include another more rigid or dense material that moves toward the mobile device 102 and causes the dielectric material 312 to compress when the outer button 310 is pressed.

As shown in FIG. 3, the upper housing assembly 210 additionally includes a screen cover layer 316. The screen cover layer 316 may provide a cover over a portion of the touchscreen 202 of the mobile device 102 corresponding to the opening 216. The screen cover layer 316 provides additional protection to the touchscreen 202 as well as provides touch input access to the portion of the touchscreen 202 accessible via the touchscreen opening 216 within the top casing 302. The screen cover layer 316 may be constructed from a variety of materials, such as glass, plastic, or another material that enables a user to interact with and provide inputs via the touchscreen 202.

The screen cover layer 316 may include a button opening 318. The button opening 318 may correspond to placement of the button assembly 106 within the upper housing assembly 210 of the barcode-reading accessory 104. In particular, when the upper housing assembly 210 is assembled and attached to the mobile device 102, the button opening 318 provides an opening through which a user can interact with the outer button 310 and cause the dielectric material 312 to come into direct contact with the button 204 or other portion of the touch interface of the mobile device 102 (e.g., a discrete portion or region of the touchscreen 202).

In one or more embodiments, the screen cover layer 316 includes an adhesive property. For instance, the screen cover layer 316 may include a microvent gasket back mask adhesive that adheres to the mobile device 102. For example, a back surface (e.g., the surface of the screen cover layer 316 configured to come into contact with the mobile device 102) of the screen cover layer 316 may include an adhesive or otherwise adherent surface that, when placed into contact with the touchscreen 202, maintains contact with the touchscreen 202 by increasing a friction coefficient between the mobile device 102 and the screen cover layer 316. In this way, the screen cover layer 316 provides an additional point of contact that reduces relative movement between the mobile device 102 and the barcode-reading accessory 104.

The screen cover layer 316 may additionally include an opening 320 through which light passes to the camera lens 206 on the mobile device 102. When the screen cover layer 316 is aligned with a top surface of the mobile device 102, the opening 320 similarly aligns with the camera lens 206.

As shown in FIG. 3, the upper housing assembly 210 additionally includes a shock protection layer 322. The shock protection layer 322 may be constructed using any shock-absorbing material that provides some shock protection to the mobile device 102 when the barcode-reading accessory 104 is attached to the mobile device 102. For example, the protection layer 322 may be constructed using a liquid silicone rubber (LSR) material that provides shock protection while additionally providing a seal around an outer edge of the mobile device 102.

Similar to other elements of the upper housing assembly 210, the shock protection layer 322 includes a size and shape corresponding to design properties of the mobile device 102 (e.g., a make or model of the mobile device 102). In addition, the shock protection layer 322 includes a button opening 324 at a position within the shock protection layer 322 corresponding to placement of the button assembly 106 within the upper housing assembly 210 and based on a position of the button 204 on the mobile device 102. The button opening 324 provides an opening through which a user can interact with the button assembly 106 to provide an input (e.g., a button-press or tap gesture) to the mobile device 102.

Also similar to other elements of the upper housing assembly 210, the shock protection layer 322 includes a screen opening 326 at a position and shape corresponding to a position and shape of the touchscreen 202 of the mobile device 102. The screen opening 326 provides an opening through which a user can interact directly with the touchscreen 202 of the mobile device 102 and provide any number of touch inputs to the mobile device 102.

Figure 4A:
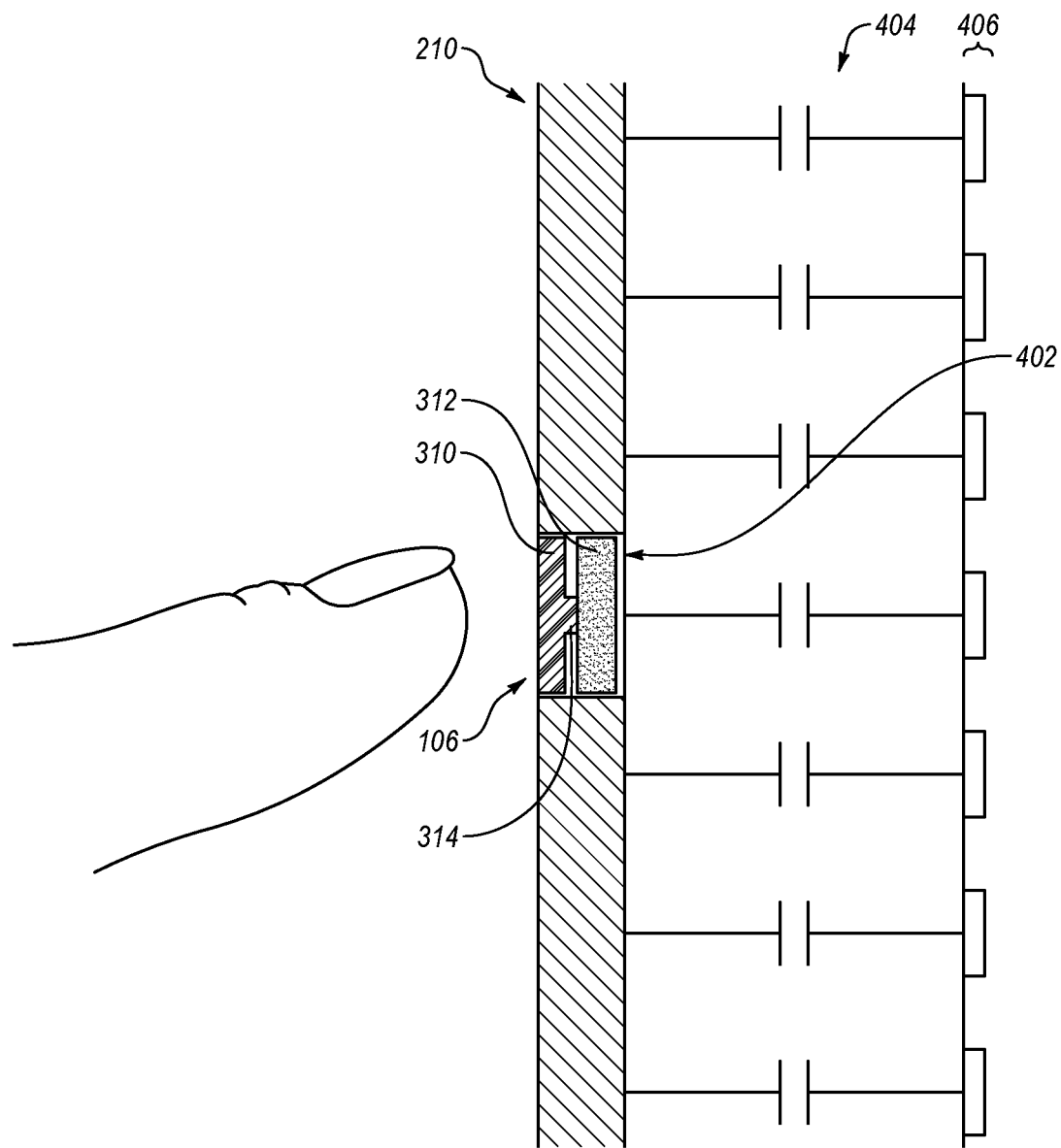
FIGS. 4A-4B illustrate a side view of a button assembly interacting with a capacitive touch interface of the mobile device in accordance with one or more embodiments.
Figure 4B:
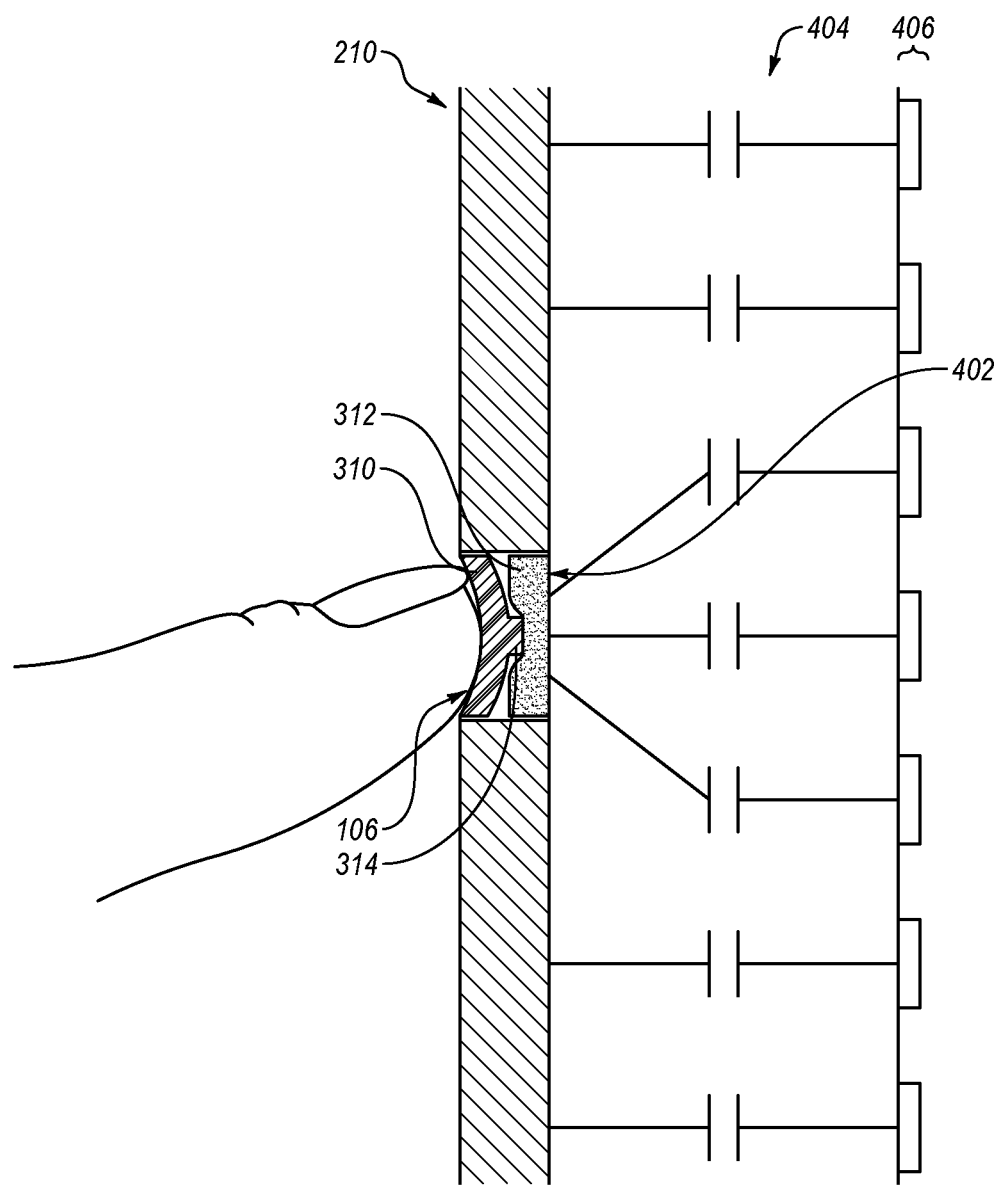

FIGS. 4A-4B illustrate additional features of the barcode-reading accessory 104 in accordance with one or more implementations described herein. In particular, FIGS. 4A-4B illustrate a cross-sectional side-view of the button assembly 106 within the upper housing assembly 210 when the barcode-reading accessory 104 is attached to the mobile device 102 prior to and while the barcode-reading system 100 is receiving a touch input. In particular, FIG. 4A shows a cross-sectional side-view of the button assembly 106 including an outer button 310, dielectric material 312, and a protruding member 314 prior to (or after) being compressed while FIG. 4B illustrates a cross-sectional side-view of the button assembly 106 while being compressed.

As shown in FIG. 4A, when the barcode-reading accessory 104 is attached to the mobile device 102, the outer button 310 faces outward from the mobile device 102 while the dielectric material 312 is positioned next to a surface 402 of the touch interface. In addition, as shown in FIG. 4A, the button assembly 106 may include a protruding member 314 positioned between the outer button 310 and the dielectric material 312. As discussed above, the touch interface may refer to a button 204 of the mobile device 102, a location or region of the touchscreen 202, or a combination of a touchscreen and button(s).

As discussed above, the touch interface may include a capacitive interface (e.g., a capacitive touchscreen or button) capable of sensing contact of a capacitive object that comes into contact with the surface 402. For example, as shown in FIG. 4A, the touch interface includes a capacitive layer 404 that serves as a conductive medium capable of re-directing an electrical current or electric field in response to a conductive object coming into contact with the surface 402. The touch interface additionally includes an electrode layer 406 to illustrate a path of an electric field through the capacitive layer 404. The touch interface illustrated in FIGS. 4A-4B including the surface 402, capacitive layer 404, and electrode layer 406 is provided by way of example, as the touch interface may refer to any capacitive interface commonly employed by mobile devices.

As shown in FIG. 4A, prior to receiving an input, the outer button 310 may be flush with an outer surface of the upper housing assembly 210. As further shown, the dielectric material 312 may rest flush with or just out of contact with the surface 402 of the touch interface to avoid redirecting an electrical current between the electrode layer 406 and the capacitive layer 404. For example, the button assembly 106 may be positioned within an opening of the upper housing assembly 210 such that there is a small gap between the dielectric material 312 and the surface 402 of the touch interface.

As shown in FIG. 4B, the outer button 310 may receive a force applied on the button assembly 106 by way of a finger or other input object coming into contact with the outer button 310 of the button assembly 106. In response to the input force, the outer button 310 may compress toward the surface 402 of the touch interface and cause the protruding member 314 to come into contact with the dielectric material 312. In response the dielectric material 312 can similarly contract and come into contact with the surface 402 of the touch interface.

In response to the dielectric material 312 coming into contact with or otherwise engaging the surface 402 of the touch interface, the dielectric material 312 can cause redirection of an electrical field between the electrode layer 406 and the surface 402 of the touch interface. As represented by the modified path of capacitance through the capacitive layer 404, the dielectric material 312 may cause a redirection of an electrical current to a location on the touch interface corresponding to where the dielectric material 312 comes into contact with the surface 402. This location may correspond to a button 204 (as shown in FIG. 2) or, alternatively, to a location on a touchscreen 202 where the button assembly 106 is positioned when the barcode-reading accessory 104 is attached to the mobile device 102.

Figure 5A:
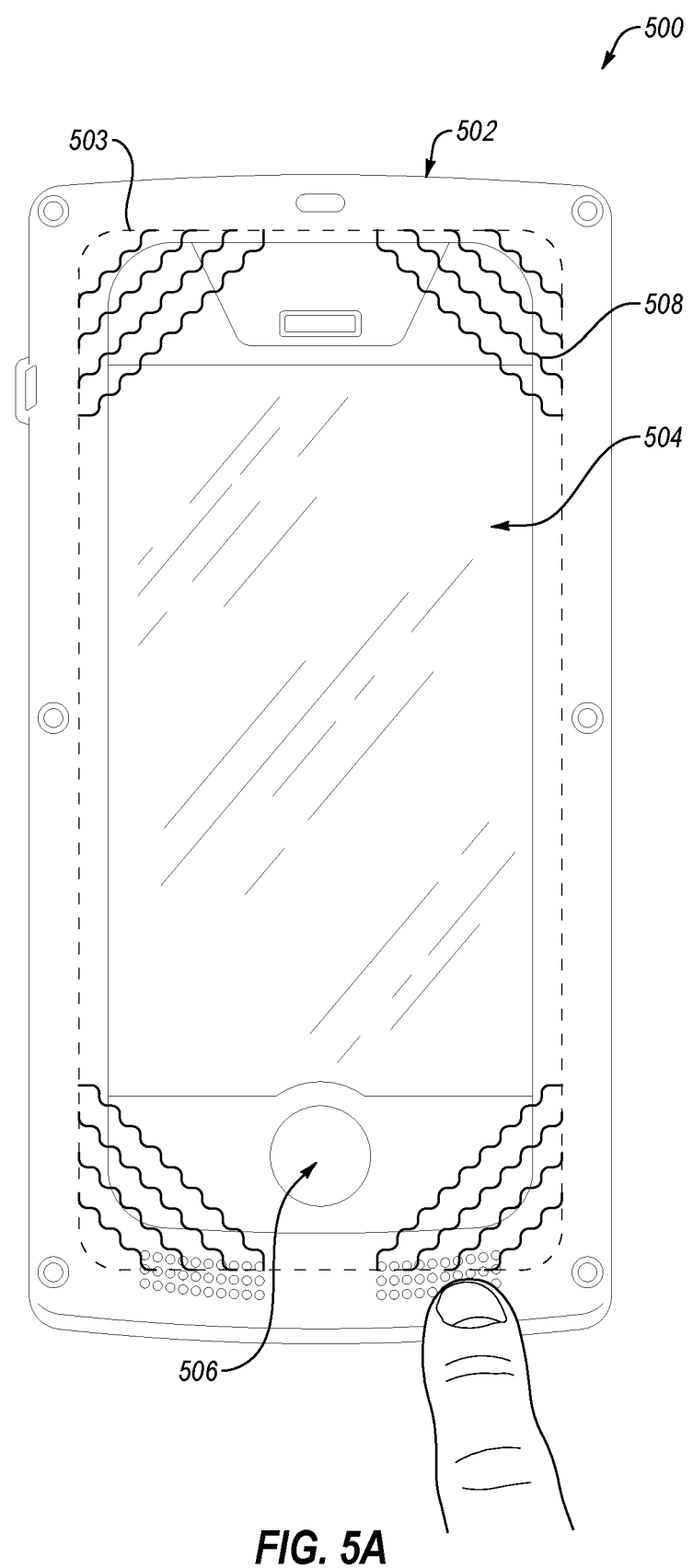
FIGS. 5A-5B illustrate a top view of the barcode-reading system illustrating a conductive path of electrical current in response to the button assembly of the mobile device attachment interacting with a touch interface of the mobile device.
Figure 5B:
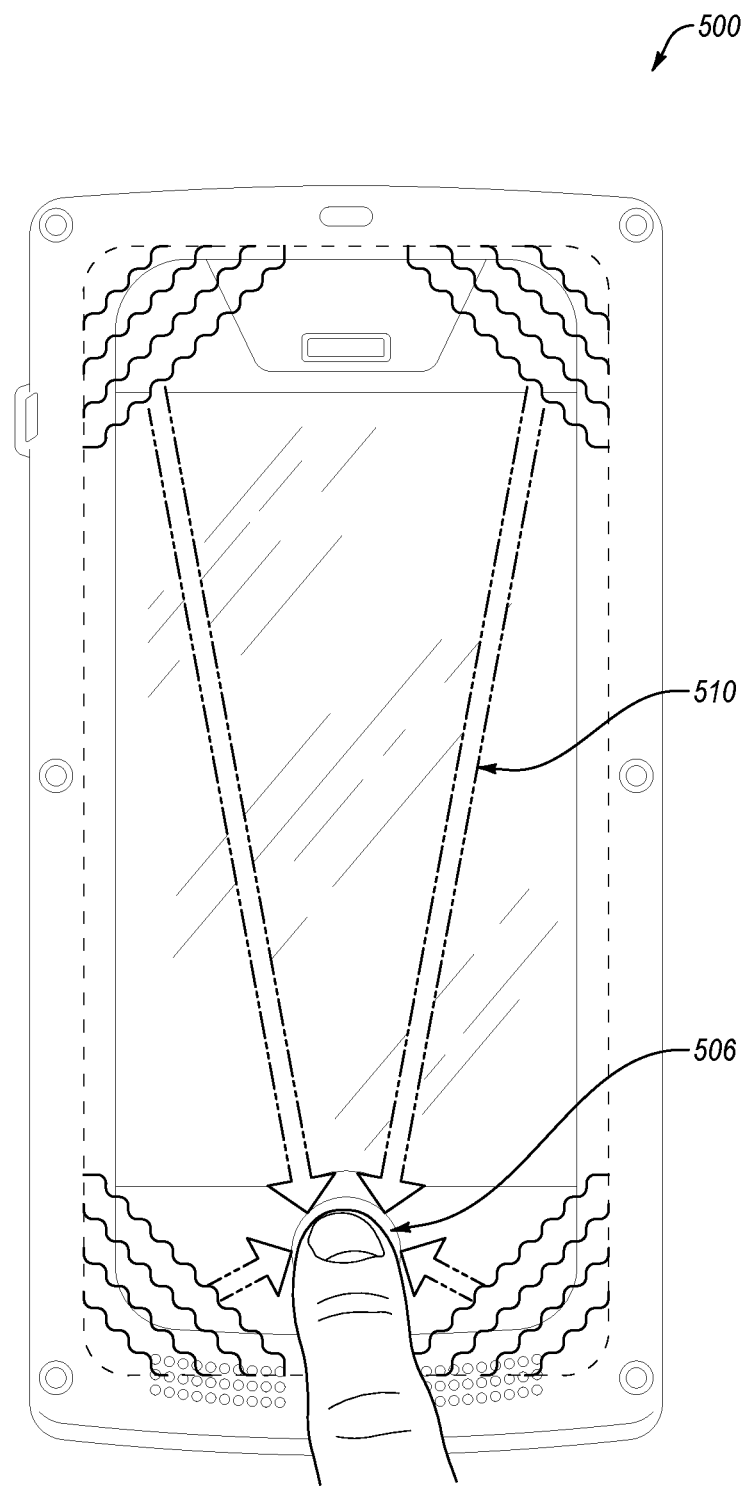

FIG. 5A-5B provide further illustration showing a path of an electric current relative to a surface of the touch interface in response to detecting a user input. In particular, FIGS. 5A-5B illustrate a top view of an example barcode-reading system 500 including similar features as the barcode-reading system 100 including the mobile device 102 and barcode-reading accessory 104 described above in connection with FIGS. 1-3. In particular, as shown in FIGS. 5A-5B, the barcode-reading system 500 includes a mobile device 502 including a touch interface 503, a barcode-reading accessory 504 attached to the mobile device 502, and a button assembly 506.

As shown in FIGS. 5A-5B, the mobile device 502 may generate and apply a low-grade voltage to the corners of the touch interface 503 to generate an electric field 508 at the corners of the touch interface 503 (as shown in FIG. 5A). Prior to detecting a user input, the electric field 508 may include a uniform electric field localized at the corners of the touch interface 503.

In response to a user of the barcode-reading system 500 pressing the button assembly 506, causing the button assembly 506 to compress, and further causing a dielectric material to come into contact with or otherwise engage with the touch interface 503, the capacitive property of the touch interface 503 may be activated, causing an electrical current 510 to be drawn from each of the corners of the touch interface 503 (as shown in FIG. 5B). The electrical current 510 may flow from each of the corners of the touch interface to a location on the touch interface 503 corresponding to the button assembly 506 (e.g., where the dielectric material of the button assembly 506 comes into contact with and activates the capacitive properties of the touch interface 503).

The terms "comprising," "including," and "having" (and grammatical variants thereof) are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A barcode-reading system comprising:
   a mobile device comprising a touch interface; and
   a barcode-reading accessory comprising:
      an accessory housing configured to be attached to the mobile device, the accessory housing comprising a first opening corresponding to a first portion of the touch interface and a second opening over a second portion of the touch interface that provides input access to the second portion of the touch interface; and
      a button assembly comprising an outer button and a dielectric material, wherein the outer button is positioned within the first opening of the housing, and wherein the dielectric material is positioned between the outer button and the touch interface of the mobile device when the housing is attached to the mobile device;
      wherein the outer button comprises a compressible material that, when compressed toward the touch interface while the accessory housing is attached to the mobile device, causes the dielectric material to engage the touch interface, causing the mobile device to detect an input corresponding to the first portion of the touch interface.

2. The barcode-reading system of claim 1, wherein causing the mobile device to detect the input comprises activating capacitive properties of the touch interface in response to the dielectric material engaging the first portion of the touch interface.

3. The barcode-reading system of claim 1, wherein causing the mobile device to detect the input comprises causing a camera on the mobile device to capture an image comprising a barcode within a field of view of the camera.

4. The barcode-reading system of claim 1,
wherein the accessory housing is sized to be attached to a corresponding make or model of the mobile device; and
wherein the button assembly is positioned within the first opening of the accessory housing based on the corresponding make or model of the mobile device.

5. The barcode-reading system of claim 1, wherein the first portion of the touch interface corresponds to a discrete region of a touchscreen of the touch interface.

6. The barcode-reading system of claim 1, wherein the second opening of the accessory housing is substantially larger than the first opening of the accessory housing, and wherein the second portion of the touch interface comprises a majority of a total area of the touch interface on the mobile device.

7. The barcode-reading system of claim 1, wherein the barcode-reading accessory comprises a screen cover attached to the accessory housing, wherein when the accessory housing is attached to the mobile device, the screen cover covers the second portion of the touch interface.

8. The barcode-reading system of claim 7, wherein the screen cover further comprises an opening that aligns with the first opening of the accessory housing when the accessory housing is attached to the mobile device.

9. The barcode-reading system of claim 7, wherein the screen cover comprises an adhesive property that, when placed in contact with the touch interface when the accessory housing is attached to the mobile device, secures components of the barcode-reading accessory in place relative to the touch interface.

10. The barcode-reading system of claim 1, wherein the accessory housing comprises a liquid silicon rubber (LSR) seal that, when the accessory housing is attached to the mobile device, secures components of the barcode-reading accessory in place relative to the touch interface.

11. The barcode-reading system of claim 1, wherein the outer button comprises a compressible rubber material that, when compressed, applies a force on the dielectric material and causes the dielectric material to engage the touch interface by coming into contact with the first portion of the touch interface of the mobile device.

12. The barcode-reading system of claim 1, wherein the dielectric material comprises a dielectric foam.

13. A barcode-reading accessory comprising:
an accessory housing sized and shaped to attach to a mobile device, the accessory housing comprising a first opening at a first location within the accessory housing, the first location within the accessory housing corresponding to a first portion of a touch interface of the mobile device associated with a desired input of an application on the mobile device, the accessory housing further comprising a second opening corresponding to a location of a second portion of the touch interface, the second opening providing input access to the second portion of the touch interface when the accessory housing is attached to the mobile device; and
a button assembly positioned at least partially within the first opening of the accessory housing, the button assembly comprising:
an outer button positioned within the first opening and visible from a front surface of the accessory housing; and
a dielectric material positioned behind the outer button from the front surface of the accessory housing;
wherein the outer button comprises a compressible material that, when compressed inward from the front surface of the accessory housing, causes the dielectric material to engage the touch interface of the mobile device when the accessory housing is attached to the mobile device.

14. The barcode-reading accessory of claim 13, wherein causing the dielectric material to engage the touch interface of the mobile device causes the mobile device to detect the desired input of the application on the mobile device by activating capacitive properties of the touch interface of the mobile device corresponding to the first location on the mobile device.

15. The barcode-reading accessory of claim 13,
wherein the accessory housing is sized to be attached to a corresponding make or model of the mobile device that does not have a physical home button on a front surface of the mobile device; and
wherein the button assembly is positioned within the first opening of the accessory housing based on the corresponding make or model of the mobile device.

16. The barcode-reading accessory of claim 13, wherein the barcode-reading accessory comprises a screen cover attached to the accessory housing, and wherein, when the accessory housing is attached to the mobile device, the screen cover covers the second portion of the touch interface while providing input access to the second portion of the touch interface.

17. The barcode-reading accessory of claim 13,
wherein the outer button comprises a compressible rubber material that, when compressed, applies a force on the dielectric material and causes the dielectric material to engage the touch interface by coming into contact with the first portion of the touch interface of the mobile device; and
wherein the dielectric material comprises a dielectric foam.

18. A barcode-reading accessory comprising:
an accessory housing sized and shaped to attach to a mobile device, the accessory housing comprising a first opening at a first location within the accessory housing, the first location within the accessory housing corresponding to a first portion of a touch interface of the mobile device associated with a desired input of an application on the mobile device, the accessory housing further comprising a liquid silicon rubber (LSR) seal that, when the accessory housing is attached to the mobile device, secures components of the barcode-reading accessory in place relative to the mobile device; and
a button assembly positioned at least partially within the first opening of the accessory housing, the button assembly comprising:
an outer button positioned within the first opening and visible from a front surface of the accessory housing; and
a dielectric material positioned behind the outer button from the front surface of the accessory housing;
wherein the outer button comprises a compressible material that, when compressed inward from the front surface of the accessory housing, causes the dielectric material to engage the touch interface of the mobile device when the accessory housing is attached to the mobile device.

* * * * *